US009898766B2

(12) United States Patent
Schreiner et al.

(10) Patent No.: US 9,898,766 B2
(45) Date of Patent: Feb. 20, 2018

(54) PAYMENT PROCESSING FOR CLIENT DEVICES

(75) Inventors: J. Sage Schreiner, Kirkland, WA (US); Sean Nordberg, Bellevue, WA (US); Jeremy Corley, Clyde Hill, WA (US); Nancy Sedora, Vashon, WA (US); Steve Lunsman, Kirkland, WA (US); Matthias Baer, Seattle, WA (US); David Manci Gardner, Seattle, WA (US); Patrick J. Derks, Seattle, WA (US); Rahul Dhar, Seattle, WA (US); Matt Pisut, Issaquah, WA (US); James Oleinik, Bellevue, WA (US); Tal Goldbloom, Seattle, WA (US); Ashish Virmani, Seattle, WA (US); Yoav Sion, Seattle, WA (US); Gene Michael DeClark, Kirkland, WA (US); Anubhav Kale, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 482 days.

(21) Appl. No.: 13/464,214

(22) Filed: May 4, 2012

(65) Prior Publication Data

US 2013/0297452 A1    Nov. 7, 2013

(51) Int. Cl.
*G06Q 30/00* (2012.01)
*G06Q 30/06* (2012.01)
*G06Q 20/32* (2012.01)
*G06Q 20/40* (2012.01)
*G06Q 30/02* (2012.01)

(52) U.S. Cl.
CPC ......... *G06Q 30/06* (2013.01); *G06Q 20/3221* (2013.01); *G06Q 20/405* (2013.01); *G06Q 30/0613* (2013.01); *G06Q 30/0617* (2013.01); *G06Q 30/0619* (2013.01);
(Continued)

(58) Field of Classification Search
CPC ............... G06Q 30/0613; G06Q 30/06; G06Q 30/0617; G06Q 30/0619; G06Q 30/0635; G06Q 30/02; G06Q 30/0221; G06Q 20/405; G06Q 20/3221
USPC ... 705/26.1, 26.41, 27.1, 14.58, 14.1, 14.17, 705/14.22
See application file for complete search history.

(56) References Cited

U.S. PATENT DOCUMENTS 7,499,875 B1    3/2009    May et al.
7,921,299 B1 *  4/2011    Anantha ................. G06F 21/53
                                                       705/51
(Continued)

OTHER PUBLICATIONS

Chong et al., "Towards Flexible Mobile Payment via Mediator-based Service Model," *In Proceedings of the 8th International Conference on Electronic Commerce*, Aug. 14, 2006, pp. 295-301.

*Primary Examiner* — Yogesh C Garg
(74) *Attorney, Agent, or Firm* — Klarquist Sparkman, LLP (57) ABSTRACT

A method of payment using a client device is disclosed. The payment can be made through a payment method service that can control the payment flow and options available to the user of a client device. Using the payment method service, new payment options with new data schemas and/or new process flows can be used by the client device, but without any need to update software stored on the client device. The payment method service can utilize the look and feel of the client device, such that the user views payment options in the native UI of the client device.

17 Claims, 11 Drawing Sheets

(52) U.S. Cl.
CPC ......... *G06Q 30/0635* (2013.01); *G06Q 30/02* (2013.01); *G06Q 30/0221* (2013.01)

(56) References Cited

U.S. PATENT DOCUMENTS

| | | | |
|---|---|---|---|
| 8,041,606 B2 | 10/2011 | Mascavage, III et al. | |
| 8,121,945 B2 * | 2/2012 | Rackley et al. | 705/40 |
| 2002/0067370 A1 * | 6/2002 | Forney | G06F 17/30873 |
| | | | 715/742 |
| 2004/0054569 A1 * | 3/2004 | Pombo et al. | 705/7 |
| 2005/0125251 A1 * | 6/2005 | Berger | G06Q 10/06 |
| | | | 719/310 |
| 2006/0149671 A1 | 7/2006 | Nix et al. | |
| 2008/0078831 A1 * | 4/2008 | Johnson et al. | 235/380 |
| 2008/0275779 A1 | 11/2008 | Lakshminarayanan | |
| 2010/0269152 A1 * | 10/2010 | Pahlavan | G06F 9/4445 |
| | | | 726/3 |
| 2011/0047075 A1 * | 2/2011 | Fourez | G06Q 20/32 |
| | | | 705/44 |
| 2011/0065451 A1 * | 3/2011 | Danado et al. | 455/456.1 |
| 2011/0276418 A1 | 11/2011 | Velani | |
| 2011/0320347 A1 | 12/2011 | Tumminaro et al. | |
| 2012/0022930 A1 * | 1/2012 | Brouhard | 705/14.22 |
| 2012/0022944 A1 * | 1/2012 | Volpi | 705/14.53 |
| 2012/0271712 A1 * | 10/2012 | Katzin et al. | 705/14.51 |

\* cited by examiner

PAYMENT PROCESSING FOR CLIENT DEVICES

FIELD

The present application relates generally to financial transactions, and, more particularly, to flexibility in selecting payment instruments for client devices.

BACKGROUND

Consumer transactions with merchants are increasingly being made with payment methods other than cash or checks. More recently, the device being used to conduct such consumer transactions is a mobile electronics device having wireless communications, such as a cellular telephone or a Personal Digital Assistant (PDA).

A variety of payment methods have been developed in different countries to adapt to the rapidly changing market of online payments. Examples include Alipay® (China), MarcadoPago® (South America), Paypal® (U.S.), just to name a few, each which has a different data schema for required user information.

One common problem with the wide variety of payment methods for online content, especially in international markets, is how to handle the diverse business logic associated with each payment method. This logic can be complicated and can include making a payment method unavailable for certain purchases, adjusting the price of a purchase, forcing a payment method to be a user's default due to contractual obligations, etc. One example of why a payment method may be unavailable includes one or more of the following: the amount is over a specific threshold; there is an unsupported price point; the purchase is not valid for specific companies, or the purchase is not supported by the payment processor in the user's locale. Price adjustments can also occur for a variety of reasons including surcharges or discounts for using a particular payment method.

Implementing this business logic on the client is difficult. First, the logic or obligations can change, and changes can require expensive and time consuming client-releases. Second, new online content releases often occur, and can imply new rules. Third, small errors or problems can have critical ramifications, but require an expensive and time consuming client release to fix.

With rapid changes occurring in the online marketplace, new code releases are becoming more frequent, increasing the need for a more flexible solution.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method of payment using a client device is disclosed. The payment can be made through a payment method service that can control the payment flow and options available to the user of a client device. Using the payment method service, new payment options with new data schemas and/or new process flows can be used by the client device, but without any need to update software stored on the client device. The payment method service can utilize the look and feel of the client device, such that the user views payment options in the native UI of the client device, rather than having a browser experience wherein the look and feel is controlled by a server sourcing the content.

In one embodiment, a price of an item to purchase is received by a client device. A user identification, content identification and a price can be transmitted to a payment method service. In response, a list of available payment methods is received by the client device and can be displayed in a format that has the look and feel of the native UI. Thus, in one example, the list is displayed in a format corresponding to the device settings on the client device. The look and feel of the client device can have a variety of aspects, such as font, size, color, etc.

In another embodiment, the list can include additional information associated with the payment methods, such as parameters associated with one or more business rules of the payment method. The business rules can vary depending on the business method, but the parameters can include an adjusted price, an available balance, tax implications, a notice that the payment method is unavailable for a particular reason (e.g., locale is outside of available area, an unsupported price point, the purchase is not valid for specific companies), etc.

In yet another embodiment, the payment method service can request additional information from the user in order to complete the transaction. Thus, the payment method service can control the purchase flow and, depending on the particular payment method, determine that additional information is needed. An address (e.g., URL, URI, etc.) can be used as a pointer to a website of the payment method or to an associated application to assist the user through the steps desired to complete the transaction.

Using various embodiments disclosed herein, a new payment option can be added for use by a client device, without the need to update client software. Instead, a server based payment method service allows greater flexibility, while still allowing the client device to maintain control of the look and feel of payment options.

The foregoing and other objects, features, and advantages of the invention will become more apparent from the following detailed description, which proceeds with reference to the accompanying figures.

DETAILED DESCRIPTION

Figure 1:
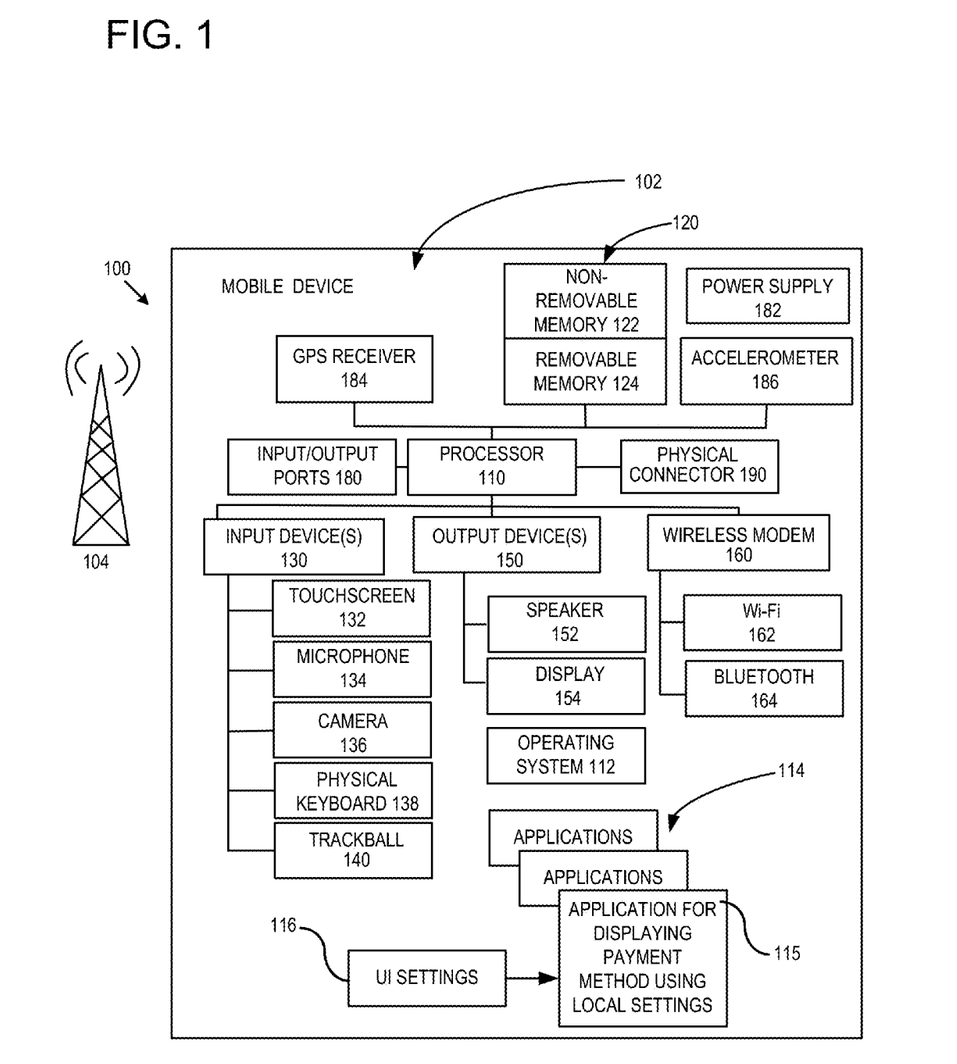
FIG. 1 is a system diagram of an exemplary mobile device that can include an application for displaying payment methods using local look-and-feel settings.

FIG. 1 is a system diagram depicting an exemplary mobile device 100 including a variety of optional hardware and software components, shown generally at 102. Any components 102 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 104, such as a cellular or satellite network.

The illustrated mobile device 100 can include a controller or processor 110 (e.g., signal processor, microprocessor, ASIC, or other control and processing logic circuitry) for performing such tasks as signal coding, data processing, input/output processing, power control, and/or other functions. An operating system 112 can control the allocation and usage of the components 102 and support for one or more application programs 114. The application programs can include common mobile computing applications (e.g., email applications, calendars, contact managers, web browsers, messaging applications), or any other computing application. A particular application of interest (shown at 115) is one in which multiple payment methods can be displayed using a payment method service, as further described below. The application 115 can have access to native UI settings, shown at 116, to display the payment methods available using the look and feel of the client device.

The illustrated mobile device 100 can include memory 120. Memory 120 can include non-removable memory 122 and/or removable memory 124. The non-removable memory 122 can include RAM, ROM, flash memory, a hard disk, or other well-known memory storage technologies. The removable memory 124 can include flash memory or a Subscriber Identity Module (SIM) card, which is well known in GSM communication systems, or other well-known memory storage technologies, such as "smart cards." The memory 120 can be used for storing data and/or code for running the operating system 112 and the applications 114. Example data can include web pages, text, images, sound files, video data, or other data sets to be sent to and/or received from one or more network servers or other devices via one or more wired or wireless networks. The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 100 can support one or more input devices 130, such as a touchscreen 132, microphone 134, camera 136, physical keyboard 138 and/or trackball 140 and one or more output devices 150, such as a speaker 152 and a display 154. Other possible output devices (not shown) can include piezoelectric or other haptic output devices. Some devices can serve more than one input/output function. For example, touchscreen 132 and display 154 can be combined in a single input/output device.

A wireless modem 160 can be coupled to an antenna (not shown) and can support two-way communications between the processor 110 and external devices, as is well understood in the art. The modem 160 is shown generically and can include a cellular modem for communicating with the mobile communication network 104 and/or other radio-based modems (e.g., Bluetooth or Wi-Fi). The wireless modem 160 is typically configured for communication with one or more cellular networks, such as a GSM network for data and voice communications within a single cellular network, between cellular networks, or between the mobile device and a public switched telephone network (PSTN).

The mobile device can further include at least one input/output port 180, a power supply 182, a satellite navigation system receiver 184, such as a Global Positioning System (GPS) receiver, an accelerometer 186, and/or a physical connector 190, which can be a USB port, IEEE 1394 (FireWire) port, and/or RS-232 port. The illustrated components 102 are not required or all-inclusive, as any components can deleted and other components can be added.

Figure 2:
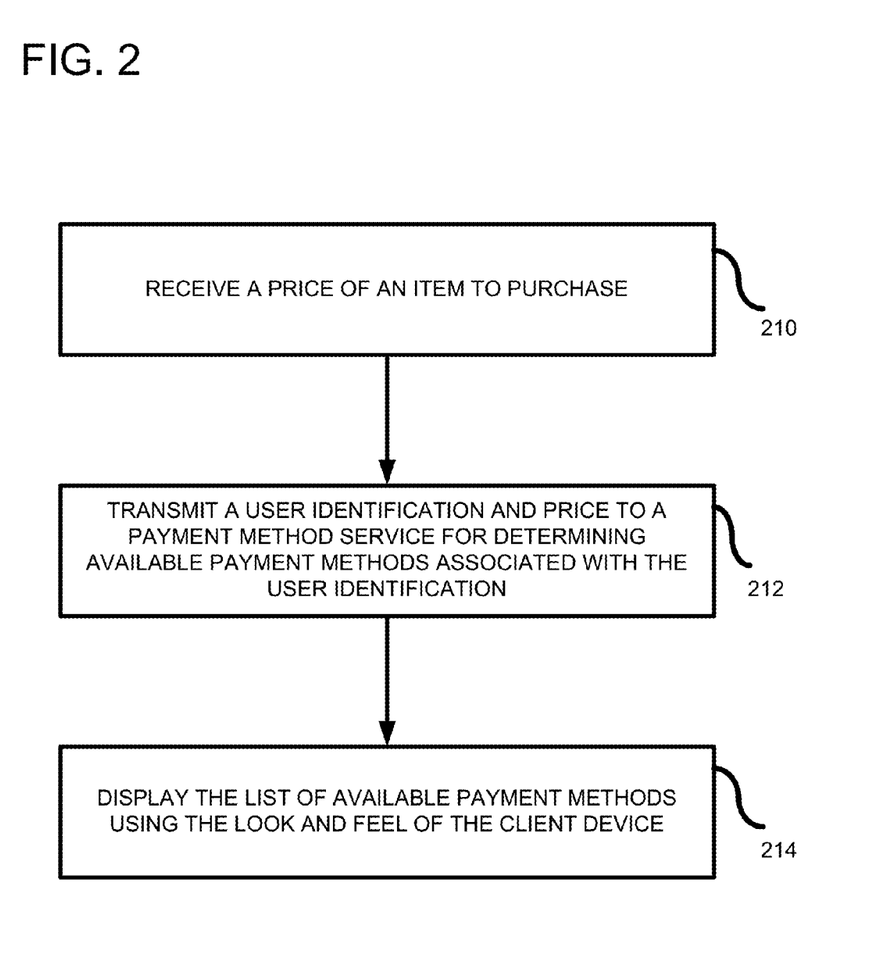
FIG. 2 is a flowchart of a method for displaying a list of available payment methods.

FIG. 2 is a flowchart of a method for displaying multiple payment options. In process block 210, a price can be received to purchase an item. For example, a user can be shopping at an online store or in an online catalog that displays content on a client device supplied from a first server computer. When a user selects an item to purchase, at least the price is transmitted to the client device. Additionally, an item identifier can be sent to the client device. In process block 212, the client device transmits a user identification and the price to a payment method service. Other parameters can be sent, such as the item identifier. The payment method service can be a second server computer, different from the first server computer. As such, it can be a third-party payment method service that assists in completing the transaction. The payment method service can determine, using the user identification, what payment options are available to the user. In process block 214, the payment methods can then be displayed on the client device using a look and feel of the client device. For example, a list of available payment methods can be displayed to the user using locally stored UI settings, such as fonts, color, sizing, etc. The locally stored UI settings can be selectable or changeable by the user. As such, the user is able to control the look and feel of the list of payment options available for completing the transaction.

Figure 3:
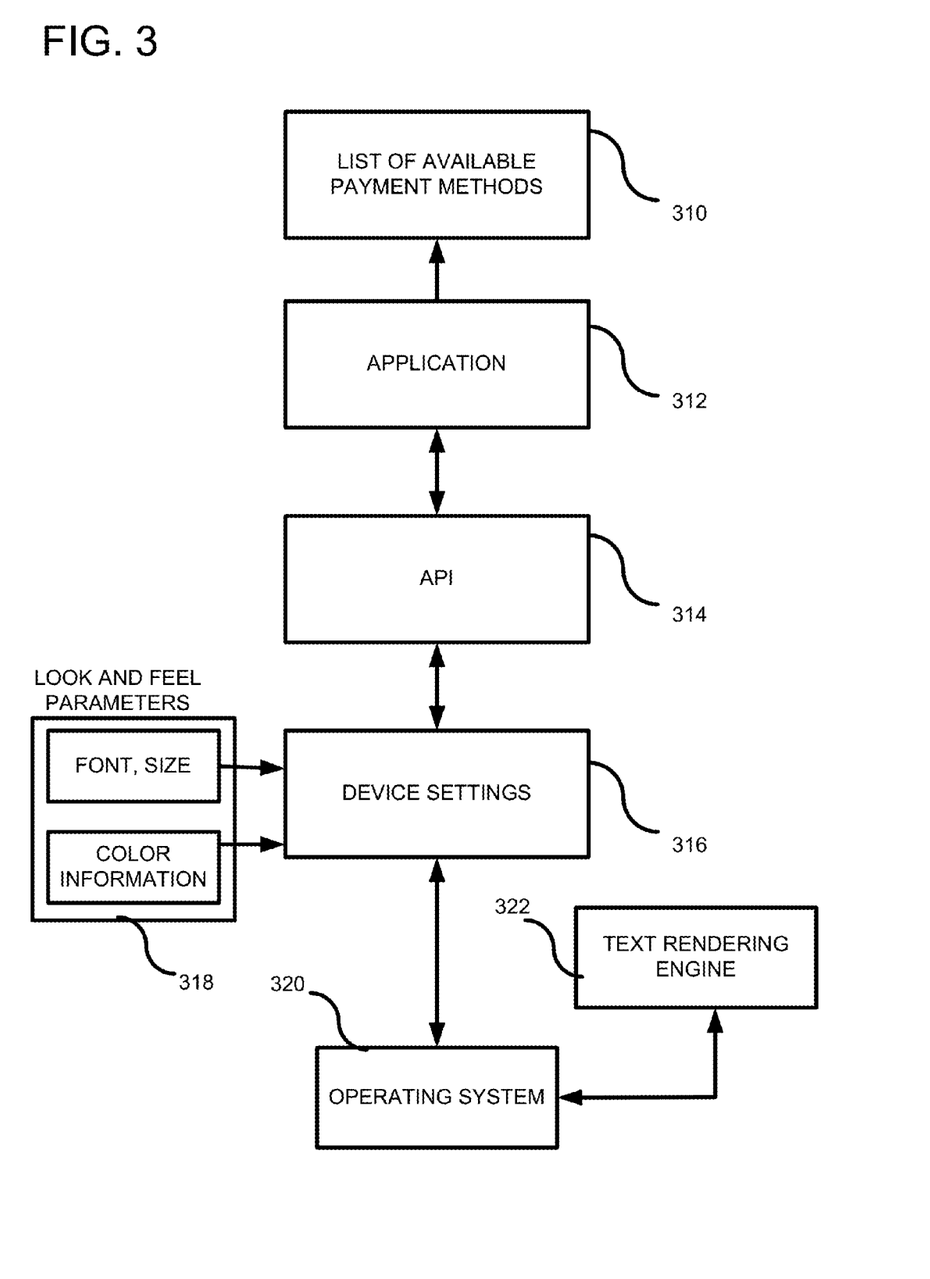
FIG. 3 is a system level diagram showing the structure for displaying a list of payment methods using local device settings.

FIG. 3 is an exemplary system diagram of client device that can be used to display a list 310 of payment options in the native UI of the client device. In order to display the list 310 in the native UI, an application 312 that receives the list, accesses device settings 316 through an API 314. The device settings 316 include look and feel parameters 318 that can include font, size and color information, and other UI-related parameters (not shown). The device settings 316 are also available to an operating system 320 that uses a text rendering engine 322 to display the list 310 on the client display in accordance with instructions from the application 312. In this way, the device settings can control the look and feel of the displayed list. Other system structures can be used, but, generally, the look and feel parameters are locally stored and used by other applications executing on the client device. As such, the client device can have a uniform look and feel across applications so as to provide a satisfactory user experience.

Figure 4:
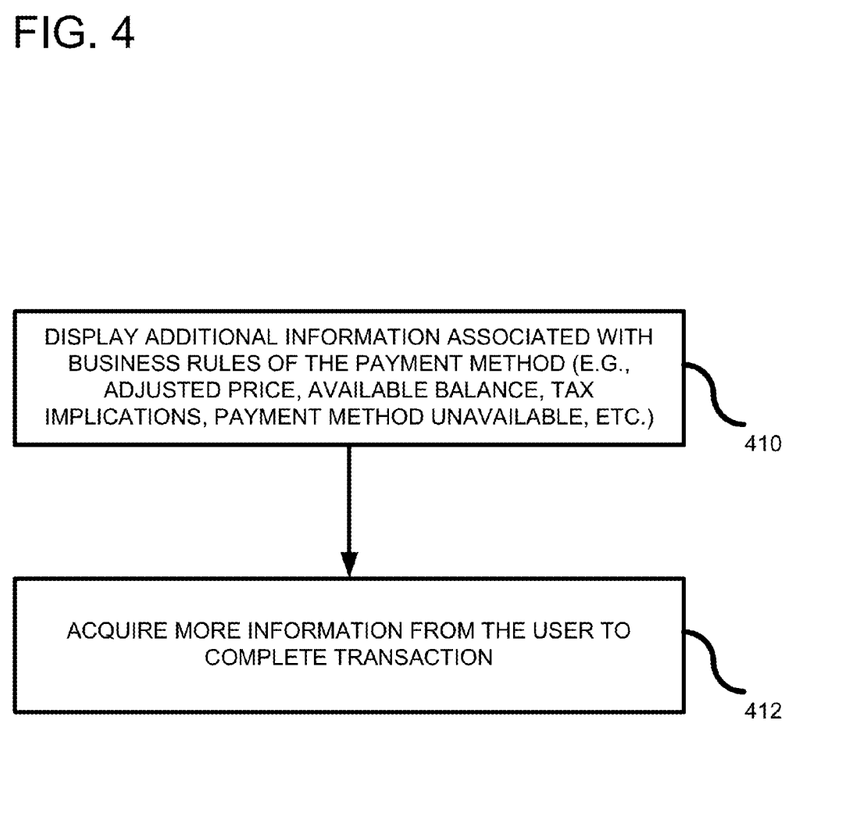
FIG. 4 is a flowchart of a method showing additional process blocks that can be implemented.

FIG. 4 is a flowchart of the method showing additional process blocks that can be performed by the payment method service. In process block 410, the payment method service can apply business rules associated with each payment method. Furthermore, additional information can be displayed on the client device, so that the user can make informed decisions about which payment method to use. For example, an adjusted price can be displayed taking into account the original price plus any discounts or surcharges associated with a particular payment method. An available balance associated with a payment method can also be disclosed, as well as tax implications. If desired, information can be displayed indicating that a payment method is unavailable and why it is unavailable. For example, payment methods being unavailable depend on business rules associated with the payment method and can include that the price is over a specific threshold, there is an unsupported price point, the purchase is not valid for a specific company, or the purchase is not supported by the payment processor in the user's locale. Other business rules can also be applied and depend on the particular payment method. Process block 412 shows that additional process flow can also be requested to be completed by the user in order to finish the transaction. For example, the user can be required to complete a data schema provided by the selected payment method, and/or the user can be required to accept certain conditions. In any event, the process flow can be updated and modified without the need to update the client device itself, as the process flow is controlled by the payment method service located on a server computer.

Figure 5:
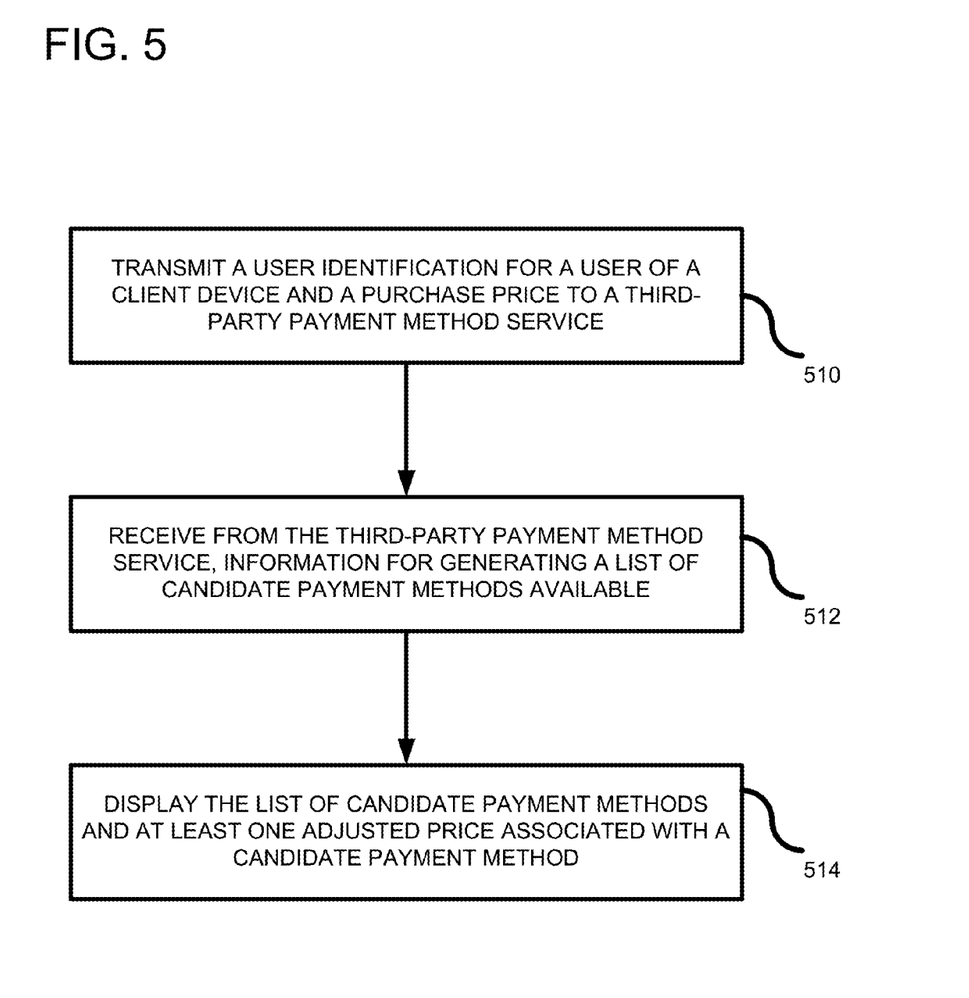
FIG. 5 is another flowchart of an embodiment wherein an adjusted price is included in the displayed list.

FIG. 5 shows another flowchart of an embodiment, wherein a plurality of candidate payment options are listed together with at least one adjusted price. In process block 510, a user identification and a purchase price are transmitted to a third-party payment method service. Generally, the transmission is from a client device to a server computer through a network connection, such as the Internet. The payment method service is termed "third-party" because it can be independently controlled and separate from a service that supplied the purchase price to the client device. For example, the purchase price can be supplied from a catalog server that is different from a server associated with the payment method service. The third-party payment method service can use the user identification to access a database in order to determine the payment options available for the client device. Thus, the same available payment options are not shown to every user. Instead, the payment options are user specific. In process block 512, the client device receives, from the third-party payment method service, information needed for generating a list of candidate payment methods available. The received information can be the list itself, or various parameters needed to generate the list. In process block 514, the list of candidate payment methods can be displayed together with at least one adjusted price associated with a candidate payment method. To provide a simple example of the different options, assume the price of an item is $10.00. If the payment method has a surcharge of $2.00, either the third-party payment method service can transmit to the client the total price of $12.00 or it can transmit only the price adjustment of $2.00 and the client device can add the base price to the adjustment to determine the total price.

Figure 9:
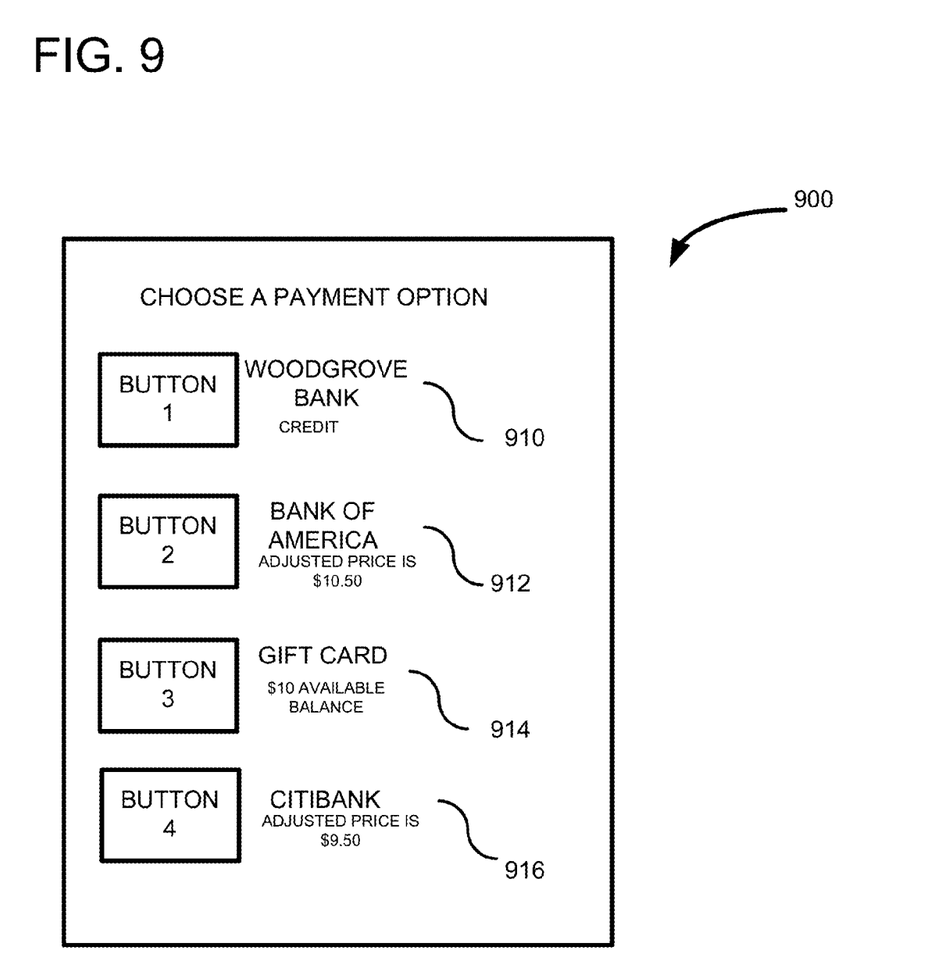
FIG. 9 is an example user interface showing payment options and additional information associated with business rules of each payment method.

Turning briefly to FIG. 9, an example display 900 with a list of candidate payment methods 910, 912, 914, and 916 is shown. The candidate payment method of Bank of America® is shown having an "adjusted price" of $10.50, whereas Citibank® has an adjusted price of $9.50. Thus, different payment options can have different adjusted prices based on surcharges and discounts. Other parameters associated with business rules of the particular payment method can also be displayed, such as "credit", listed together with payment method 910, and "$10 available balance" listed together with payment method 914.

Figure 6:
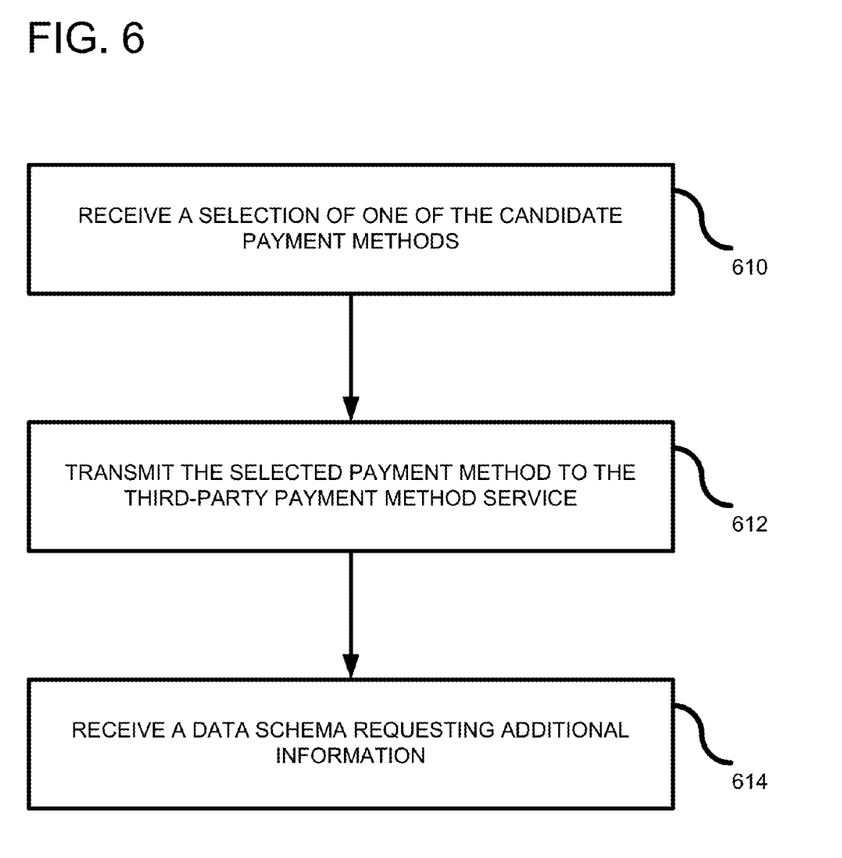
FIG. 6 shows additional process blocks that can be used in conjunction with FIG. 5.

FIG. 6 shows another aspect of the payment method service wherein additional information is needed from the user in order to complete the transaction. In process block 610, a selection is received for one of the candidate payment methods. Thus, after being presented with a list of payment options, the user selected the desired payment method. In process block 612, the selected payment method is transmitted back to the third-party payment method service. In response to the transmission, the third-party payment method service can determine that additional information is needed to complete the transaction. As such, the third-party payment service can initiate a steps needed to obtain the additional information. In process block 614, a data schema associated with the selected payment method is received and displayed by the client device to obtain the additional information from the user.

Figure 7A:
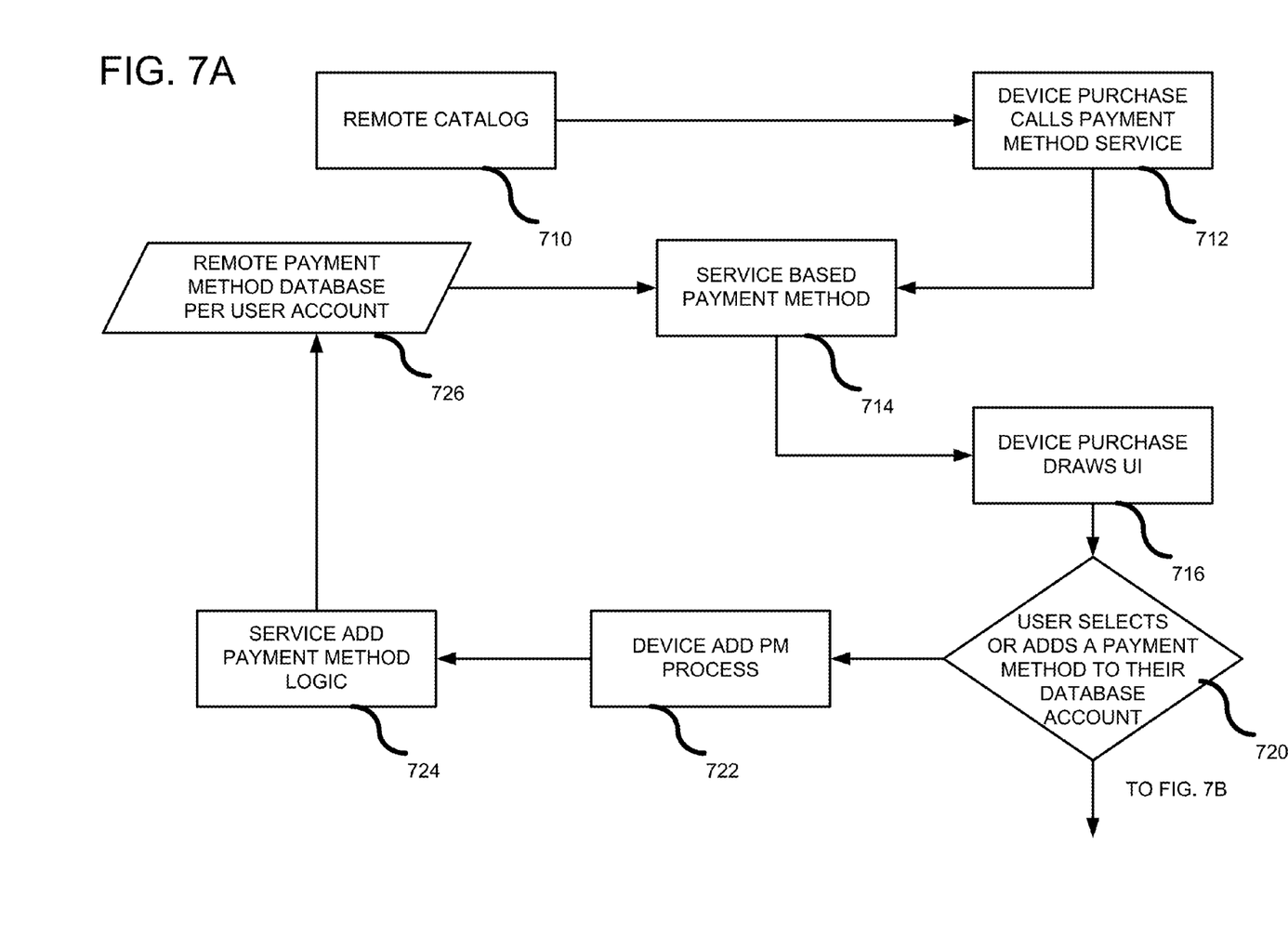
FIGS. 7A and 7B show a detailed flowchart of an embodiment that can be used for payment methods.
Figure 7B:
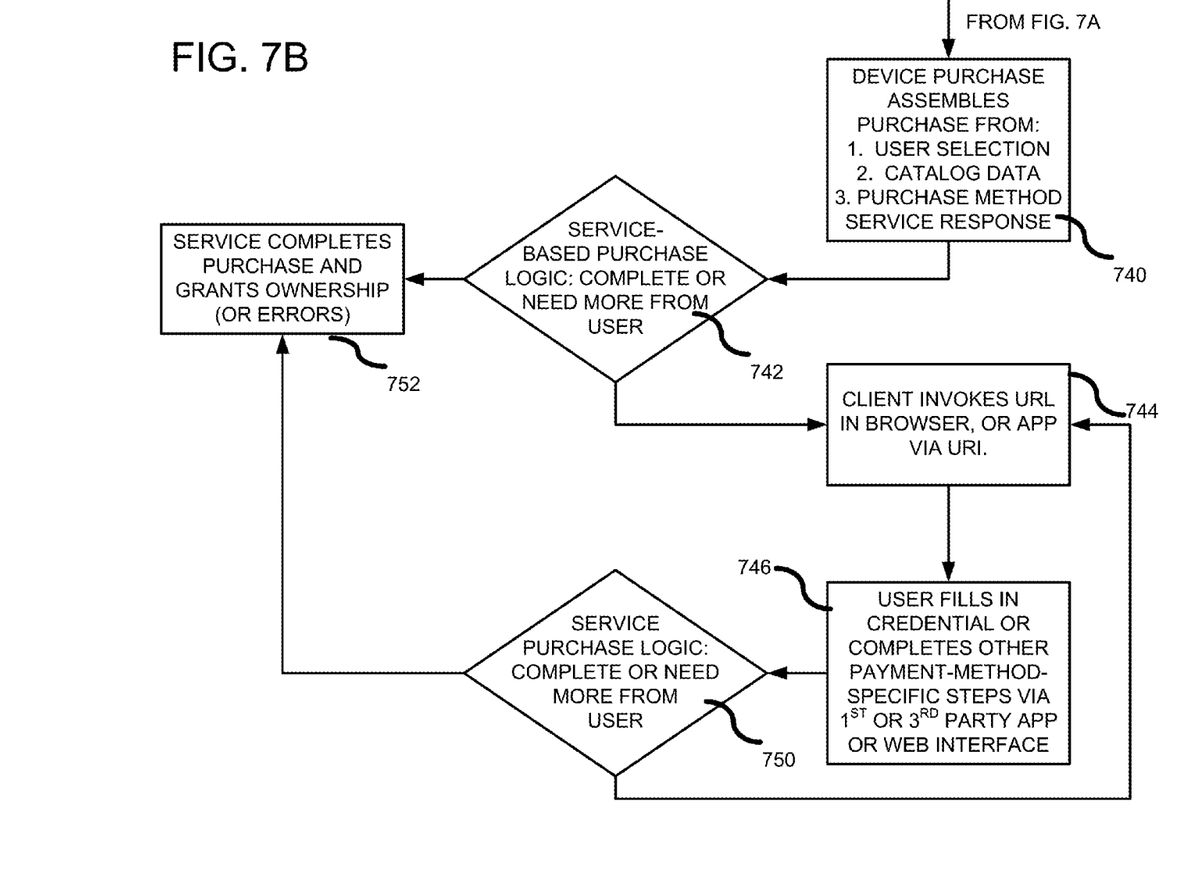

FIGS. 7A and 7B show an embodiment of a system flow that can be used for payment processing. At 710, a remote catalog is accessed by a client device in order to purchase an item. The remote catalog 710 is generally located on a first server computer and includes a plurality of items to purchase. When a user makes a selection, an item identification and price is typically transmitted to the client device. At process block 712, the client device calls a service-based payment method 714. The service-based payment method 714 is generally a third-party service used to complete the transaction. The service-based payment method 714 transmits content back to the client device regarding a list of available payment methods and potentially other content associated with business rules of the payment methods. For example, content associated with adjusted price, tax implications, unavailability, etc. In process block 716, the client device displays the list. In some embodiments, the list can be displayed using the client device settings so that the native UI is applied. In decision block 720, the user of the client device selects a payment method or chooses to add a new payment method. Selection of an existing payment method, for which the user has already signed up, is described further below in regard to FIG. 7B. If the user chooses to add a new payment method, then in process block 722, the client adds a payment method process and sends a request to the service-based payment method (process block 724) to add the new payment method. The service-based payment method adds the new payment method to the user account by updating database 726. Thus, the database 726 can be searched using the user identification as a key in order to determine the available payment methods. Such information can then be provided to the service-based payment method 714, which can then pass the available payment methods to the client for display.

FIG. 7B is a flowchart showing additional process blocks that can be implemented after the user selects a payment method. In process block 740, the client assembles the purchase using the user selection, the item identification, and the purchase method service response. The client then sends a user identification, item identification, selected payment method, and other desired parameters to the service-based purchase logic. The service-based purchase logic uses the data from the client to decide if the purchase can be completed or if more information is needed. If it is decided that more information is needed, then an address (e.g., URL, URI, etc.) and a transaction ID are sent to the client at 744. The client then invokes the URL (such as through a browser) or the URI to access a server associated with the selected payment method (process block 746). For example, if the user selected Bank of America, then Bank of America's server can be accessed. The selected payment method server is then used to step the user through the desired steps to acquire all of the information to complete the purchase. The payment method server can then complete the notification to the service. In decision block 750, the service checks if more information is needed from the user. If so, the flow returns to process block 744 with a new URL or URI used to obtain further information. Otherwise in process block 752, the service completes the purchase. Returning briefly to decision block 742, if the no additional information was needed, then the service completes at 752.

Figure 8:
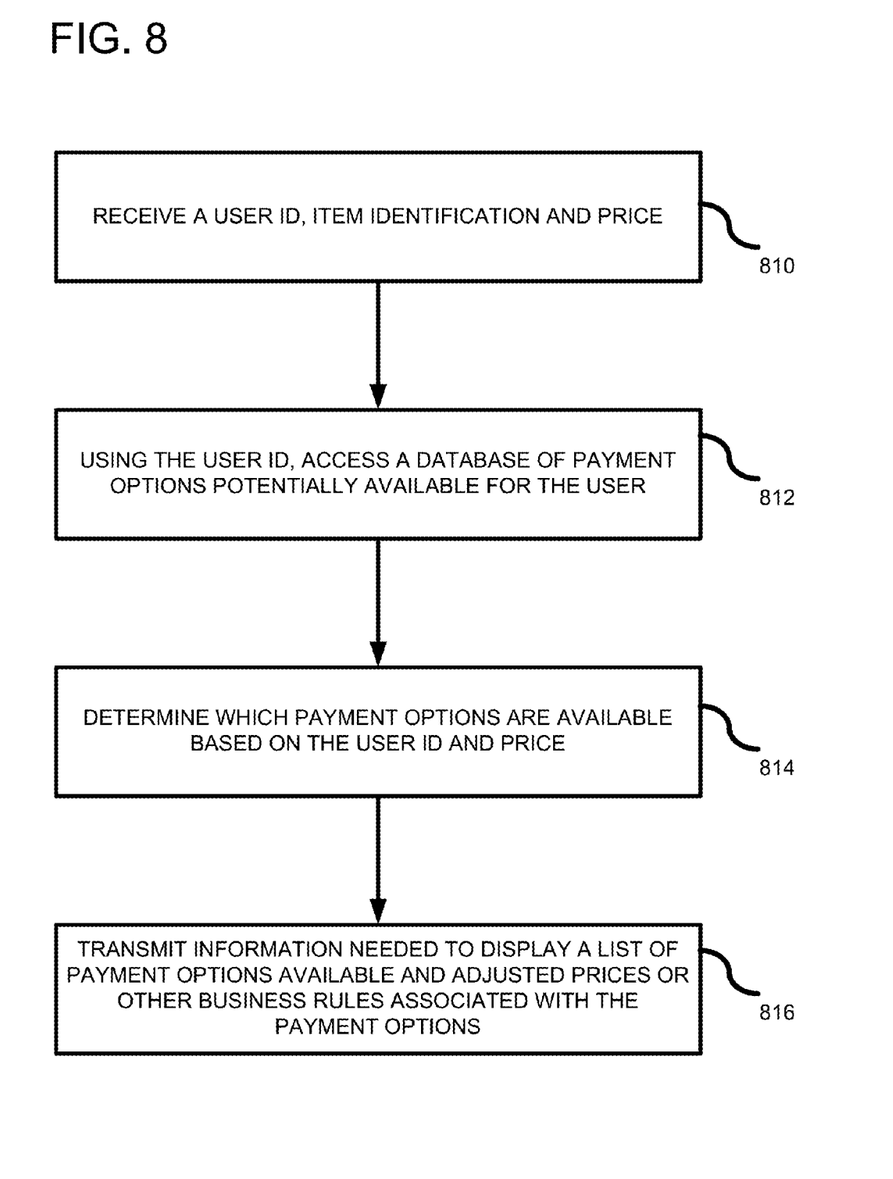
FIG. 8 is another flowchart of an embodiment for listing payment options to a user.

FIG. 8 is a flowchart of a method from the perspective of the service. In process block 810, the service receives a user identification, item identification and price. Other parameters can be received in addition to or instead of these parameters. In process block 812, the user identification is used to access a database of payment options potentially available to the user. In process block 814, using the potentially available payment options (e.g., those previously signed up for by the user), a determination can be made which payment options are actually available to the user. For example, of the potentially available options, the price, locale or other business rules can exclude some of the options so that those options actually available to the user is only a subset of the potentially available options. In process block 816, information needed to display a list of available options is sent to the client device, and can further include adjusted prices or other business rules associated with the payment options.

Figure 10:
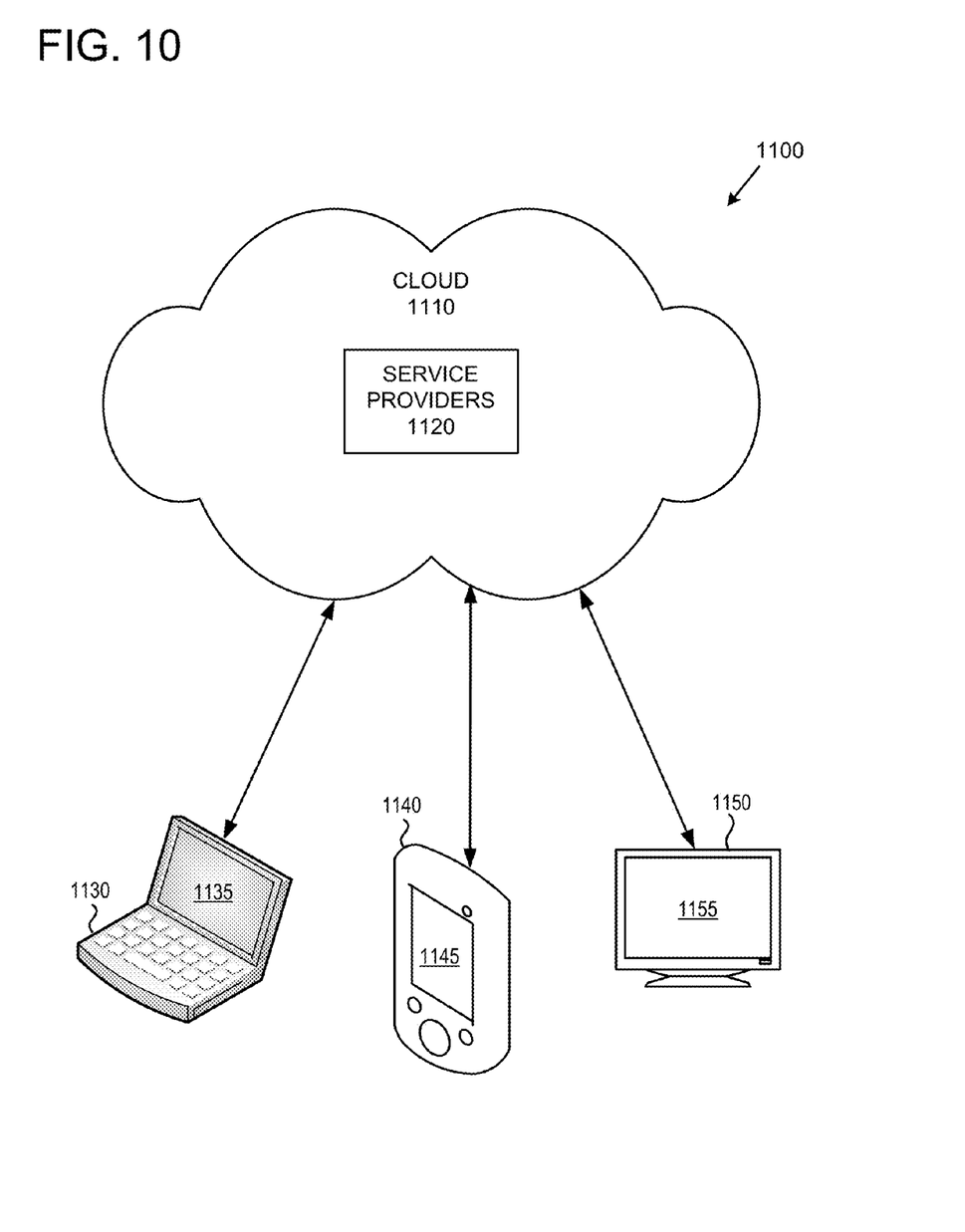
FIG. 10 is an embodiment wherein the look and feel can be shared across various client devices having different platforms.

FIG. 10 shows an environment wherein multiple client devices are associated together through a cloud. In example environment 1100, various types of services (e.g., computing services) are provided by a cloud 1110. For example, the cloud 1110 can comprise a collection of computing devices, which may be located centrally or distributed, that provide cloud-based services to various types of users and devices connected via a network such as the Internet. The implementation environment 1100 can be used in different ways to accomplish computing tasks. For example, some tasks (e.g., processing user input and presenting a user interface) can be performed on local computing devices (e.g., connected devices 1130, 1140, 1150) while other tasks (e.g., storage of data to be used in subsequent processing) can be performed in the cloud 1110.

In example environment 1100, the cloud 1110 provides services for connected devices 1130, 1140, 1150 with a variety of screen capabilities. Connected device 1130 represents a device with a computer screen 1135 (e.g., a mid-size screen). For example, connected device 1130 could be a personal computer, such as desktop computer, laptop, notebook, netbook, or the like. Connected device 1140 represents a device with a mobile device screen 1145 (e.g., a small size screen). For example, connected device 1140 could be a mobile phone, smart phone, personal digital assistant, tablet computer, or the like. Connected device 1150 represents a device with a large screen 1155. For example, connected device 1150 could be a television screen (e.g., a smart television) or another device connected to a television (e.g., a set-top box or gaming console) or the like. One or more of the connected devices 1130, 1140, 1150 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1100. For example, the cloud 1110 can provide services for one or more computers (e.g., server computers) without displays.

Services can be provided by the cloud 1110 through service providers 1120, or through other providers of online services (not depicted). For example, cloud services can be customized to the screen size, display capability, and/or touchscreen capability of a particular connected device (e.g., connected devices 1130, 1140, 1150). Shared client device settings can be stored in the cloud and used across all of the connected devices so that they have a similar look and feel. The list of payment options sent to any of the devices can be displayed in the cloud-based client settings.

In example environment 1100, the cloud 1110 provides the technologies and solutions described herein to the various connected devices 1130, 1140, 1150 using, at least in part, the service providers 1120. For example, the service providers 1120 can provide a centralized solution for various cloud-based services. The service providers 1120 can manage service subscriptions for users and/or devices (e.g., for the connected devices 1130, 1140, 1150 and/or their respective users).

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

Thus, for a high-level summary, the core functional flow is a back and forth query/response between a client device and a server-based service. It can start at the point that a user selects an item in an on-line catalog. An item identifier, price and elements desired to display to the client (such as thumbnail graphic) can be provided to the device. The user can select the item to buy. The device can call a service with the user's unique database ID, and the item's unique catalog ID. The service can then look up the user to see what Payment Methods are associated with them. The service looks up the item in a catalog data base that stores a variety of information, such as price, developer, seller, exclusions or special offers etc. The service can use the item, it's price, and the user's unique payment methods as input to a decision system. The decision system can output configuration data that is used by the device. The service can also assembles additional data into a "context blob" that can be used by the service purchase logic to finalize the purchase. The context blob obviates the need for the client to understand unique requirements for certain payment methods. The client uses the service response to tailor the device UI. For example, the client can mark a Payment Method as unavailable for this purchase, mark a Payment method as preferred for this purchase (e.g., the most economical), adjust (surcharge or discount) the price of purchase, and display the adjusted price to the user before purchase, if a specific purchase method is used, or if additional tax liabilities are calculated, or re-order payment methods in the UI presented to the user.

The user can then select a payment method to use or chooses to associated a new payment method with their account. If the user chooses to associate (Add) a new purchase method to their database account, the user is taken through a set of steps or interfaces that allow them to enter required identifying data, and the system loops back to the point where the device calls the service at the outset. At this point, the user can select a payment method. The "context blob" for the purchase, as well as unique catalog ID are sent to the Purchase service by the device.

The purchase service compares the data in the device-generated call to insure validity, and processes it. Valid responses include the following: a) Purchase succeeded: the device is informed he purchase has succeeded, as the unique user ID is credited with ownership of the item selected for purchase; b) Purchase failed: an error message or error code is returned to the device for display to the user; c) More information needed. An address and a unique transaction ID is returned to the client. The address can trigger a web interface, or an application on the device, where the user can complete necessary steps. The transaction ID is used to reference the data from the step and the originating transaction with the service. On completion, the device recalls service purchase with the transaction ID.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A method of displaying payment options using a client device, comprising:
   receiving, at a client device, a price associated with an item to purchase, from a first server computer;
   transmitting a user identification and at least the price to a second server computer for determining payment methods associated with the user identification;
   receiving, from the second server computer, a list of available payment methods specific to the user identification, wherein the available payment methods are a subset of potentially available options for which the user previously signed up;
   retrieving, by a processor on the client device executing a first application, native user interface (UI) settings stored in the client device, wherein the native UI settings are configured locally on the client device, and wherein the native UI settings are shared with a second application in the client device;
   transforming, by the processor on the client device, the list of available payment methods into a formatted list of available payment methods using the retrieved native UI settings;
   displaying, on the client device by the first application, the formatted list of the available payment methods, wherein the formatted list of available payment methods has the look and feel of the second application based on the native UI settings.

2. The method of claim 1, wherein the look and feel includes font, size and color information stored in settings on the client device.

3. The method of claim 1, further including displaying additional information associated with at least one of the payment methods, the additional information associated with business rules of the payment method.

4. The method of claim 1, further including receiving user input selecting a payment method from the list, and transmitting from the client device to the second server computer the selected payment method and the user identification.

5. The method of claim 4, further including receiving from the second server computer, in response to the transmission, a network address for supplying additional data needed for the selected payment method.

6. The method of claim 5, further including using the network address to obtain and display data needed by the selected payment method to complete the purchase.

7. The method of claim 1, further including displaying an adjusted price for each candidate payment method, wherein the adjusted price takes into consideration charges from the payment method.

8. A method of displaying payment options for a purchase using a client device, comprising:

in response to a user selecting an item to purchase at a purchase price, transmitting, from the client device, a user identification for a user of the client device and the purchase price to a third-party payment method service executing on at least one server computer;

receiving, at the client device, from the third-party payment method service through a network, a list of candidate payment methods available for the user, wherein the list of candidate payment methods is dependent on the user identification, and wherein the list of candidate payment methods includes only a first portion of the potentially available payment options associated with the user identification, while a second portion of potentially available payment options are excluded from the list of candidate payment methods based on the purchase price;

retrieving, from local storage in the client device, a set of look and feel parameters, wherein the set look and feel parameters control a look and feel of applications in a native user interface on the client device; and displaying, on the client device by an application, the list of candidate payment methods and at least one adjusted purchase price associated with a candidate payment method on the client device for selection by the user, wherein the list of candidate payment methods is transformed so that it is displayed by the application having the look and feel of the native user interface.

9. The method of claim 8, further including calculating the adjusted purchase price using the information supplied from the third-party payment method service.

10. The method of claim 8, wherein the adjusted purchase price is based on a surcharge or discount associated with the candidate payment method and taxation liabilities.

11. The method of claim 8, wherein the look and feel of the displayed list is configured on the client device.

12. The method of claim 8, further including determining a most economical candidate payment method for the user and indicating the determined candidate payment method as preferred.

13. The method of claim 8, displaying candidate methods that are not available for the user and identifying them as unavailable.

14. The method of claim 8, wherein the client device is a mobile phone and further including determining a user locale of the client device using a Global Positioning Service (GPS) receiver and using the locale to determine the second portion of the potentially available payment options excluded from the list.

15. The method of claim 8, further including:
receiving, from the user, a selection of one of the candidate payment methods to use for the purchase;
transmitting the selected candidate payment method to the third-party payment method service;
receiving, at the client device, a data schema requesting additional information to be received from the user in order to complete the purchase.

16. The method of claim 8, wherein the displaying is performed without using a browser.

17. The method of claim 8, further including receiving a data schema associated with adding a new payment method and displaying the data schema using a look and feel of the client device obtained from locally stored settings.

* * * * *